US007210393B2

(12) United States Patent
Lucidera

(10) Patent No.: US 7,210,393 B2
(45) Date of Patent: May 1, 2007

(54) PROGRESSIVE-STARTING UNIT FOR PNEUMATIC SYSTEMS

(75) Inventor: Marco Lucidera, Rodengo Saiano BS (IT)

(73) Assignee: Metal Work S.p.A., Concesio (IT)

( * ) Notice: Subject to any disclaimer, the term of this patent is extended or adjusted under 35 U.S.C. 154(b) by 40 days.

(21) Appl. No.: 11/013,175

(22) Filed: Dec. 15, 2004

(65) Prior Publication Data

US 2005/0115605 A1 Jun. 2, 2005

(30) Foreign Application Priority Data

Dec. 22, 2003 (IT) .......................... MI2003A2562

(51) Int. Cl.
*G05B 1/00* (2006.01)

(52) U.S. Cl. .............................. 91/29; 91/446; 91/468; 137/110

(58) Field of Classification Search .................... 91/29, 91/446, 468; 137/110
See application file for complete search history.

(56) References Cited

U.S. PATENT DOCUMENTS

| | | | | |
|---|---|---|---|---|
| 2,998,825 A | * | 9/1961 | Gleason et al. | 137/195 |
| 4,402,254 A | * | 9/1983 | Petrimaux et al. | 91/29 |
| 4,640,311 A | * | 2/1987 | Martinet et al. | 137/884 |
| 4,915,126 A | * | 4/1990 | Gyllinder | 137/495 |
| 5,038,813 A | * | 8/1991 | Rossow | 137/110 |

FOREIGN PATENT DOCUMENTS

JP 55126107 A * 9/1980

* cited by examiner

*Primary Examiner*—Igor Kershteyn
(74) *Attorney, Agent, or Firm*—Shlesinger & Fitzsimmons

(57) ABSTRACT

A progressive-starting unit for pneumatic circuits comprises a line inlet and a line outlet interconnected with each other by a regulating valve that is piloted by a pneumatic piloting inlet. The piloting inlet is controlled by the outlet of a progressive-starting device having an inlet connected upstream of said regulating valve. In this manner a progressive-starting unit is obtained which is insensitive to the conditions downstream of its line outlet.

6 Claims, 1 Drawing Sheet

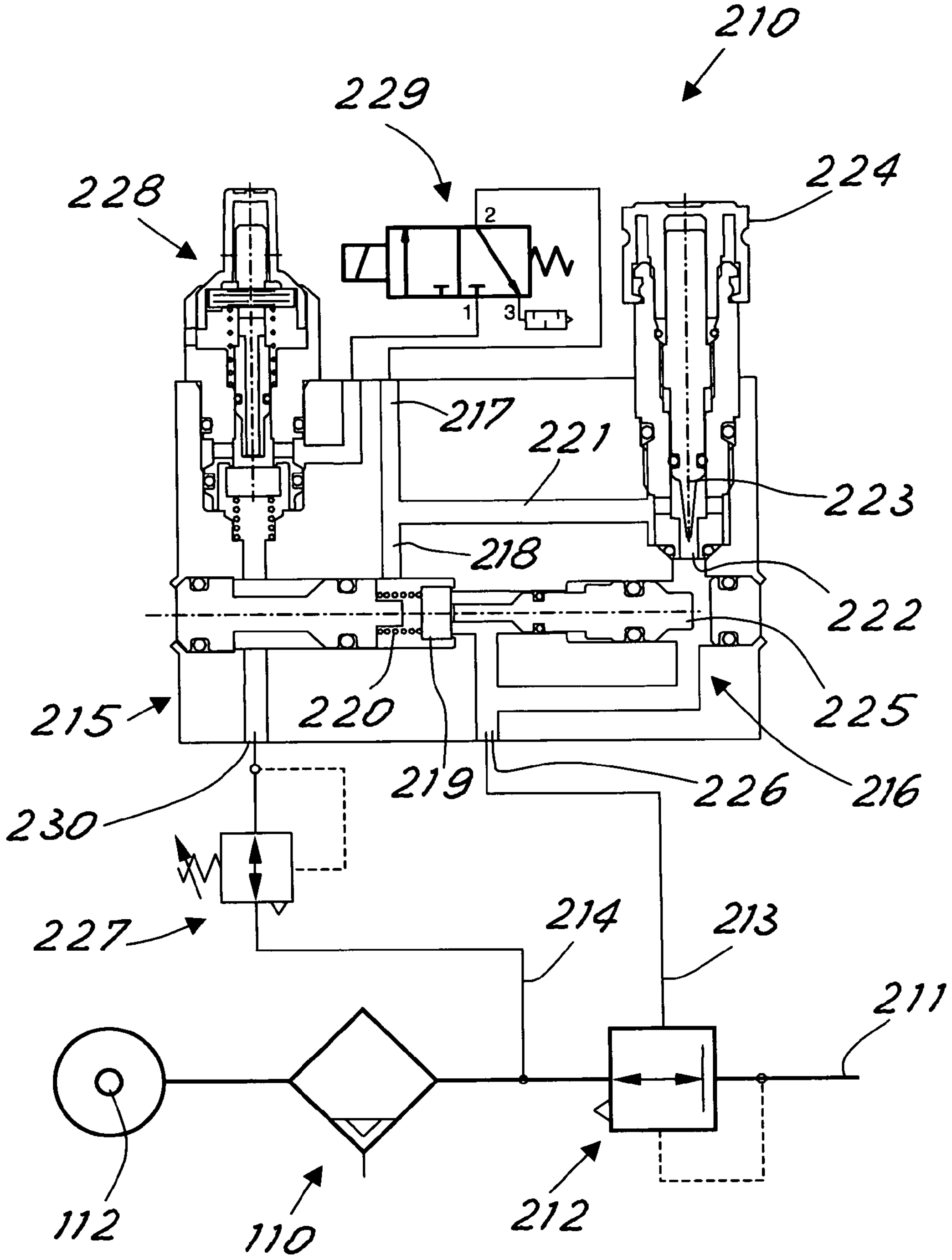
210
229
228
224
2
1
3
217
221
223
218
222
225
215
220
219
226
216
230
227
214
213
211
112
110
212

PROGRESSIVE-STARTING UNIT FOR PNEUMATIC SYSTEMS

BACKGROUND OF THE INVENTION

1. Field of the Invention

The present invention relates to a unit for air flow regulation in pneumatic systems. In particular, the unit implements the so-called progressive-starting regulation in an innovative manner.

2. State of the Prior Art

In pneumatically-operated machines it is always preferred for the compressed air to be gradually supplied on starting of the machine in order to prevent the pneumatic actuators from carrying out sudden movements that are potentially dangerous both for the machine structure and still more for people.

For the purpose, in the known art feeding valves (also called "APR" valves) have been proposed that on opening, gradually and automatically increase the air passage by means of a variable throttling disposed along the feeding line and, therefore, by a flow-rate regulation. The resulting pressure regulation therefore depends on the air request taking place at that moment downstream of the regulator and consequently it is not constant. The behavior of a known progressive starter can therefore be very different at each starting, because in the same machine on switching on, the different pneumatic actuators can be disposed at any position, depending on the actuator state at the moment of a preceding shutting off on occurrence of possible handling operations carried out manually. The intervention velocity of the starter usually takes place in a manner gauged for a medium case, taking into account the average of the air requests of the different actuators in the circuit, for example.

However, in this case the risks of sudden movements of some actuators are not prevented.

For instance, in the rather frequent case of the presence in the same machine of a plurality of actuators of big volume and some actuators of much smaller volume (i.e. in which a relatively reduced air amount is required for supplying wide movements), it may sometimes happen that on switching on, the bigger actuators are already at the end of their stroke and therefore do not move, so that the whole air fed by the regulator acts on one or more of the small actuators to move them, and therefore said small actuators can immediately have an air amount sufficient to produce a wide and quick movement which is potentially dangerous.

There is also a further problem. Since known regulators have a "trigger" point that makes them pass from a throttled feeding to a full and operating feeding of the circuit when a predetermined pressure has been reached downstream of said regulators, it may happen that in case of small leakages in the downstream circuit this trigger pressure is never reached and therefore the machine never succeeds in reaching the operating condition, even if losses by themselves would be negligible during normal operation.

It is a general aim of the present invention to obviate the above mentioned drawbacks by providing a regulating unit for progressive starting which is able to supply a satisfactory progressive starting irrespective of the conditions of the circuit downstream thereof. It is a further aim to supply a regulator which is also able to operate as a piloted regulator.

SUMMARY OF THE INVENTION

In view of the above aim, in accordance with the invention, a progressive starting unit for pneumatic circuits has been devised which comprises a line inlet and a line outlet interconnected with each other by a regulating valve that is piloted by a pneumatic piloting inlet, the piloting inlet being controlled by the outlet of a progressive-starting device having an inlet connected upstream of said regulating valve.

BRIEF DESCRIPTION OF THE DRAWINGS

For better explaining the innovative principles of the present invention and the advantages it offers as compared with the known art, a possible embodiment applying said principles will be described hereinafter by way of example, with the aid of the accompanying drawing consisting of one figure alone.

DETAILED DESCRIPTION OF THE INVENTION

With reference to the figure, a regulating unit for progressive starting is shown and generally denoted at 210. This unit comprises an inlet 112 to be connected to the compressed-air source, and an outlet 211 to which the pneumatic circuits to be fed will be connected. Possibly, a stage 110 for filtering and condensate elimination will be present in series with the inlet.

A pressure regulator 212 of the differential type is present between the inlet and outlet, i.e. with a regulating member that is movable by means of the opposite thrusts produced by the outlet pressure of the regulator and the pressure at a piloting input 213. Such a type of valve can be easily conceived by a person skilled in the art.

Connected upstream of the regulator 212 is the inlet of a secondary circuit 214 leading to the inlet 230 of a piloting unit 215 for the command 213 to valve 212.

The piloting unit comprises a progressive-starting device 216 that is fed from the inlet 214 and sends air to the command 213 from the outlet 226.

In particular, device 216 comprises an inlet duct 217 connected with the inlet 214, possibly through further control members to be described in the following. Duct 217 is divided into a main branch 218 connected with the outlet 226 through an on-off valve or closure member 219 pushed to the closed position by a spring 220, and a secondary branch 221 reaching the outlet 226 through a throttled passage 222. The throttled passage 222 can be advantageously made in an adjustable manner by means of a pin 223 that is axially movable through an adjusting hand grip 224.

A distributor or slide valve 225 exerts pressure on the closure member 219 in the opening direction thereof, against the action of spring 220, due to the pressure to which it is subjected and which is created in the outlet duct 226.

In this manner, the flow rate established by the pin produces a gradual pressure increase in the outlet duct until the thrust on the side downstream of the closure member 219 exceeds the thrust on the upstream side and the closure member opens the main duct 218 to the outlet. It is apparent that pressure variation on the outlet 226 is used to accordingly control operation of valve 212 thus producing a corresponding pressure variation in the outlet line 211. Variation on line 211 occurs irrespective of the element connected to such a line.

Thus a perfect progressive starting under any load condition of the line is obtained. Achievement of the condition of full effectiveness of the main circuit is also ensured irrespective of the presence or not of possible small pressure leakages in the main circuit itself.

At this point it is apparent that the aims of the invention have been reached by providing a progressive-starting unit in which the true progressive starter acts on piloting of a valve instead of being directly placed on the main line, as it happens in the known art.

Such a structure also offers other advantages. The progressive starter 216 must be sized for the pilot flow rate that is required by regulator 212 (which flow rate is very reduced) and not for the much bigger flow rate of the main line 211. This enables achievement of a progressive-starting unit of a bulkiness much more reduced than that necessary in the technical solutions of the known art. The intrinsic sturdiness of the unit also takes advantage of the above.

The piloting circuit of valve 212 in which the progressive starter is inserted can also advantageously be a pilot pressure-regulating circuit on the main line. In fact, by placing a known pilot pressure regulator 227 along line 214, pressure is stabilized on the outlet line 211 during normal operation after the progressive starting. In addition, a manual valve 228 and/or an electric valve 229, of the 3/2 type can also be provided in series with the pilot regulator. Advantageously, as shown in the figure, valve 228 can be inserted in the body of the progressive starter itself. Valves 228, 229 enable opening and closing of valve 212 in a controlled manner. Thus an efficient piloted regulator is obtained which is of reduced bulkiness and high sturdiness.

Obviously, the above description of an embodiment applying the innovative principles of the present invention is given by way of example only and therefore must not be considered as a limitation of the scope of the patent rights herein claimed.

What is claimed is:

1. A progressive-starting unit for pneumatic circuits, comprising a line inlet and a line outlet interconnected with each other by a regulating valve that is piloted by a pneumatic piloting inlet, the piloting inlet being controlled by the outlet of a progressive-starting device having an inlet connected upstream of said regulating valve, wherein the inlet duct of the progressive-starting device is divided into a main branch connected with the outlet through a closure member pushed to the closed position by a spring, and a secondary branch reaching the outlet through a throttled passage, the progressive-starting device comprising a control element which acts on the closure member in the opening direction of the closure member against the action of the spring, due to the pressure, to which it is submitted, that is created in the outlet duct, so that opening of the closure member is caused when a pre-established pressure is reached in the outlet duct.

2. A unit as claimed in claim 1, characterized in that the throttled passage is embodied by a pin axially movable by means of an adjusting hand grip.

3. A unit as claimed in claim 1, characterized in that the inlet of the progressive starting device is connected upstream of the regulating valve through a pilot pressure regulator.

4. A unit as claimed in claim 1, characterized in that the inlet of the progressive starting device is connected upstream of the regulating valve through a manually controlled on-off valve.

5. A unit as claimed in claim 1, characterized in that the inlet of the progressive starting device is connected upstream of the regulating valve through an electrically controlled on-off valve.

6. A unit as claimed in claim 1, characterized in that a filtering and condensate discharge device is placed between the line inlet and outlet.

* * * * *